United States Patent
Wilhelm et al.

(10) Patent No.: US 11,549,552 B2
(45) Date of Patent: Jan. 10, 2023

(54) ANTI PULL-OUT COLLAR FOR A BALL JOINT

(71) Applicant: Schaublin SA, Delémont (CH)

(72) Inventors: Chris Wilhelm, Courtavon (FR); Girolamo Toscano, Hésingue (FR)

(73) Assignee: Schaublin SA, Delémont (CH)

(*) Notice: Subject to any disclaimer, the term of this patent is extended or adjusted under 35 U.S.C. 154(b) by 80 days.

(21) Appl. No.: 16/552,349

(22) Filed: Aug. 27, 2019

(65) Prior Publication Data
US 2020/0072277 A1  Mar. 5, 2020

Related U.S. Application Data

(60) Provisional application No. 62/724,280, filed on Aug. 29, 2018.

(51) Int. Cl.
*F16C 11/06* (2006.01)

(52) U.S. Cl.
CPC ........ *F16C 11/069* (2013.01); *F16C 11/0623* (2013.01); *F16C 11/0676* (2013.01)

(58) Field of Classification Search
CPC .............. F16C 11/0623; F16C 11/0628; F16C 11/0666; F16C 11/0671; F16C 11/0676; F16C 11/069; F16C 11/0695; F16C 11/106; F16D 2003/22316; F16J 3/041; F16J 3/042; F16J 3/048; Y10T 403/31; Y10T 403/315; Y10T 403/32311; Y10T 403/32631; Y10T 403/32729; Y10T 403/32737

See application file for complete search history.

(56) References Cited

U.S. PATENT DOCUMENTS

| 3,091,486 | A | * | 5/1963 | Baker | ................. F16C 11/0671 403/130 |
| 3,216,754 | A | | 11/1965 | Smith et al. | |
| 3,269,758 | A | * | 8/1966 | Ulderup | ................ F16C 11/068 403/36 |
| 3,442,561 | A | * | 5/1969 | Henry-Biabaud | ..... B60G 7/005 384/213 |
| 3,574,368 | A | * | 4/1971 | Songer | ................ F16C 11/0604 403/128 |

(Continued)

FOREIGN PATENT DOCUMENTS

| DE | 4445251 A1 | * | 1/1996 | ............... B62D 7/16 |
| DE | 19842198 A1 | * | 4/2000 | ............ F16C 11/069 |

(Continued)

*Primary Examiner* — Josh Skroupa
*Assistant Examiner* — Kevin J Baynes
(74) *Attorney, Agent, or Firm* — Robinson & Cole LLP

(57) ABSTRACT

A ball joint includes an outer race having an exterior surface extending from an outer axial end to an inner axial end thereof and having an interior that has an opening proximate the outer axial end. The ball joint includes a ball with a stem extending therefrom. The ball is disposed in the interior area with the stem extending out of the opening. The ball joint has an anti pull-out collar disposed around the outer race and located entirely beyond a center point of the ball towards the outer axial end of the outer race. The anti pull-out collar has a radial thickness configured to prevent radial expansion of the outer race.

22 Claims, 7 Drawing Sheets

(56) References Cited

U.S. PATENT DOCUMENTS

| | | | | |
|---|---|---|---|---|
| 4,410,295 | A | * | 10/1983 | Ersoy ................ F16C 11/0657 29/418 |
| 4,666,330 | A | | 5/1987 | O'Connell et al. |
| 4,676,798 | A | * | 6/1987 | Noiles ...................... A61F 2/32 623/22.18 |
| 4,679,958 | A | | 7/1987 | Mizusawa et al. |
| 4,718,911 | A | * | 1/1988 | Kenna ....................... A61F 2/34 623/22.29 |
| 4,784,663 | A | * | 11/1988 | Kenna ....................... A61F 2/34 623/22.29 |
| 5,154,530 | A | * | 10/1992 | Dresselhouse ........... B62D 7/16 403/138 |
| 5,267,805 | A | | 12/1993 | Ueno et al. |
| 5,395,176 | A | * | 3/1995 | Zivkovic ................ B60G 7/005 403/122 |
| 5,678,947 | A | * | 10/1997 | Urbach ............... F16C 11/0633 277/507 |
| 5,824,108 | A | * | 10/1998 | Huebner ................... A61F 2/32 623/22.29 |
| 6,010,271 | A | | 1/2000 | Jackson et al. |
| 6,093,208 | A | * | 7/2000 | Tian .......................... A61F 2/32 623/22.2 |
| 6,164,829 | A | * | 12/2000 | Wenzel ............... F16C 11/0638 384/203 |
| 6,488,436 | B1 | | 12/2002 | Modat |
| 6,773,196 | B2 | * | 8/2004 | Broker ................ F16C 11/0633 403/133 |
| 6,902,345 | B2 | * | 6/2005 | Kur .................... F16C 11/0623 403/135 |
| 7,040,833 | B2 | * | 5/2006 | Kondoh ............. F16C 11/0638 403/135 |
| 7,192,214 | B2 | * | 3/2007 | Schonhoff ........... F16C 11/0671 403/122 |
| 7,260,878 | B2 | * | 8/2007 | Kondoh ............. F16C 11/0638 29/441.1 |
| 7,357,591 | B2 | * | 4/2008 | Broker ................ F16C 11/0614 403/122 |
| 8,137,021 | B2 | * | 3/2012 | Bohne ................ F16C 11/0638 403/135 |
| 8,770,882 | B2 | * | 7/2014 | Ersoy ....................... B60D 1/54 403/114 |
| 8,851,785 | B1 | * | 10/2014 | Belleau ................. F16C 11/069 403/135 |
| 9,056,538 | B2 | * | 6/2015 | Kuroda ............. F16C 11/0695 |
| 9,140,294 | B2 | | 9/2015 | Burton |
| 9,476,447 | B2 | | 10/2016 | Schmidt et al. |
| 10,309,449 | B2 | | 6/2019 | Schmidt et al. |
| 2002/0114660 | A1 | | 8/2002 | Burton |
| 2003/0077114 | A1 | * | 4/2003 | Broker .................. F16C 11/069 403/135 |
| 2004/0047677 | A1 | * | 3/2004 | Schonhoff ........... F16C 11/0628 403/135 |
| 2004/0057781 | A1 | * | 3/2004 | Bohne ................ F16C 11/0638 403/135 |
| 2005/0036827 | A1 | * | 2/2005 | Bohne ................ F16C 11/0666 403/12 |
| 2005/0105961 | A1 | * | 5/2005 | Kondoh ............. F16C 11/0633 403/122 |
| 2009/0082116 | A1 | | 3/2009 | Baechle et al. |
| 2016/0084299 | A1 | | 3/2016 | Sundararajan et al. |
| 2017/0102028 | A1 | | 4/2017 | Schmidt et al. |
| 2018/0163775 | A1 | * | 6/2018 | Graber ................ F16C 11/0638 |

FOREIGN PATENT DOCUMENTS

| | | | | |
|---|---|---|---|---|
| DE | 102008031499 | A1 | * | 1/2009 ............. B25B 27/28 |
| DE | 102007037270 | A1 | * | 2/2009 ............... B62D 7/18 |
| EP | 0793782 | B1 | | 9/2002 |
| FR | 2789359 | A1 | | 8/2000 |
| WO | 2006105928 | A1 | | 10/2006 |
| WO | 2009038566 | A1 | | 3/2009 |

* cited by examiner

ANTI PULL-OUT COLLAR FOR A BALL JOINT

CROSS REFERENCE TO RELATED APPLICATION

The instant application is a non-provisional of, and claims priority benefit to provisional patent application No. 62/724,280, entitled, "An Anti Pull-Out Collar For A Ball Joint," filed Aug. 29, 2018, the entirety of which is incorporated by reference herein.

TECHNICAL FIELD

The present invention is directed to an anti pull-out collar for a ball joint and more particularly to an anti pull-out collar that is configured to prevent radial expansion of an outer race of the ball joint to thereby prevent failure of the ball joint due to pull-out of the ball and stem from the outer race, in response to pull-out loads applied thereto.

BACKGROUND

As shown in FIG. 4, ball joints 100 typically include a spherical ball 110 that has a stem 112 extending therefrom. The ball 110 is rotatingly disposed in a concave spherical interior area 114A of an outer race 114. The stem 112 extends axially outward from an opening 114X in the outer race 114. The spherical interior area 114A extends over the ball 110 in an axial direction, towards the opening 114X and radially inward to axially retain the ball in the outer race 114. The ball 110 and stem 112 are configured to rotate and misalign relative to the outer race 114. The outer race 114 includes a stepped flange 114F extending circumferentially around and proximate to the opening 114X. The stepped flange 114F has an axially facing surface 114G that extends circumferentially around the stepped flange. The outer race 114 has a substantially cylindrical exterior surface 114B extending therearound. The outer race 114 is disposed in an interior area 116K of a bearing housing 116, such that the exterior surface 114B of the outer race engages a cylindrical interior surface 116A of the bearing housing 116. Typically, the outer race 114 is press fit (i.e., interference fit) into the bearing housing 116.

During operation, the ball joint 100 is subject to axial loads as indicated by the arrow Q. The axial load Q can become so great as to cause the stepped flange to deform radially outward in the direction of the arrows D causing a gap G to be formed between the ball and the outer race 114, proximate the opening 114X. The gap G can become so large that the axial load can cause the ball 110 to be pulled out of the outer race 114, thereby causing failure of the ball joint. Typically, the stepped flange 114F has a radial thickness that is insufficient to preclude the radial deformation and formation of the gap G.

Based on the foregoing, there is a need to provide a device that helps resist the radial deformation and helps preclude the foregoing pull-out of the ball 110 from the outer race 114.

SUMMARY

There is disclosed herein an anti pull-out collar for a ball joint. The anti pull-out collar is in the form of an annular ring that has a radially inward facing inside surface that extends between a first axial end and a second axial end thereof. The inside surface has a profile complementary in shape to a portion of an exterior surface of the ball joint. The anti pull-out collar has a radial thickness configured to prevent radial expansion of an outer race that results in failure of the ball joint due to pull-out of the ball and stem from the outer race, in response to pull-out loads applied thereto.

In one embodiment, the profile is defined by a first section having a first inside diameter and a second section having a second inside diameter that is less than the first inside diameter and a shoulder that extends between the first section and the second section.

In one embodiment, the first inside diameter and/or the second inside diameter have a magnitude configured for an interference fit on the exterior surface of the ball joint.

In some embodiments, the anti pull-out collar is made from a metallic material that is heat treated to obtain predetermined stiffness and fatigue resistance.

In one embodiment, the profile defines a retention feature configured to retain the anti pull-out collar on the exterior surface of the outer race.

In one embodiment, the anti pull-out collar defines a torque stabilization feature configured to maintain operating torque of the ball joint within a predetermined range.

In one embodiment, the anti pull-out collar has a radially outward facing outside surface extending between the first axial end and the second axial end. The outside surface has a seal receiving groove proximate the first axial end that is configured to receive a seal.

In one embodiment, the first inside diameter and/or the second inside diameter have a threaded connection with the exterior surface of the ball joint.

There is disclosed herein a ball joint that includes an outer race that has an exterior surface that extends from an outer axial end to an inner axial end thereof. The outer race has an interior area defined by a spherical inner surface and the interior area has an opening proximate the outer axial end. The ball joint includes an inner member that has a spherical ball which has a stem extending therefrom. The ball has a spherical outer surface and is disposed in the interior area with the spherical outer surface engaging the spherical inner surface of the outer race. The ball is contained in the outer race by the spherical inner surface with the stem extending out of the opening. The ball joint includes an anti pull-out collar that is defined by an annular ring which has a radially inward facing inside surface that extends between a first axial end and a second axial end thereof. The inside surface has a profile complementary in shape to a portion of the exterior surface of the outer race. The anti pull-out collar is disposed around the outer race proximate the outer axial end of the outer race. The anti pull-out collar has a radial thickness configured to prevent radial expansion of the outer race of the ball joint to thereby prevent failure of the ball joint due to pull-out of the ball and stem from the outer race, in response to pull-out loads applied thereto.

In one embodiment, the profile is defined by a first section that has a first inside diameter, a second section that has a second inside diameter that is less than the first inside diameter and an axially facing abutment surface extending between the first section and the second section of the anti pull-out collar.

In one embodiment, the exterior surface of the outer race has a flange extending radially outward from and circumferentially around the exterior surface. The flange has a shoulder facing axially towards outer axial end or the inner axial end of the outer race and has an outer circumferential surface.

In the embodiment with the shoulder facing axially towards the outer axial end of the outer race, the shoulder is located proximate the first axial end of the outer race.

In the embodiment with the shoulder facing the inner axial end of the outer race, the shoulder is located between (e.g. spaced apart from the first axial end), the outer axial end and the inner axial end of the outer race.

In one embodiment, the first inside diameter and/or the second inside diameter have an interference fit on the exterior surface of the outer race.

In one embodiment, the anti pull-out collar is made from a metallic material (e.g., an iron based alloy such as steel) that is heat treated to obtain predetermined stiffness and fatigue resistance. The outer race and/or the spherical ball are also made from a metallic material (e.g. an iron based alloy such as steel).

In one embodiment, the profile defines a retention feature configured to retain the anti pull-out collar on the exterior surface of the outer race.

In one embodiment, the anti pull-out collar defines a torque stabilization feature configured to maintain operating torque of the ball joint within a predetermined range.

In one embodiment, the shoulder of the outer ring engages the abutment surface of the anti pull-out collar.

In one embodiment, the ball joint is installed in a receiving area of a bearing housing.

In one embodiment, the second section of the anti pull-out collar is disposed axially between the bearing housing and the flange.

In one embodiment, the ball joint includes an axial restraint system.

In one embodiment, the axial restraint system is the shoulder of the outer race axially retaining an abutment surface of the anti pull-out collar. The abutment surface is defined in the profile of the anti pull-out collar and faces axially towards the first axial end or the second end of the anti pull-out collar.

There is disclosed herein a ball joint that includes an outer race that has an exterior surface that extends from an outer axial end to an inner axial end thereof. The ball joint has an interior area that is defined by a spherical inner surface. The interior area has an opening proximate the outer axial end. The ball joint includes an inner member that has a spherical ball with a stem extending therefrom. The ball has a spherical outer surface and is disposed in the interior area with the spherical outer surface engaging the spherical inner surface. The ball is contained in the interior area by the spherical inner surface with the stem extending out of the opening. The ball joint includes an anti pull-out collar that is in the form of an annular ring that has a radially inward facing inside surface which extends between a first axial end and a second axial end of the pull-out collar. The inside surface has a profile complementary in shape to a portion of the exterior surface of the outer race. The anti pull-out collar is disposed around the outer race. The entire anti pull-out collar is located beyond a center point of the ball towards the outer axial end of the outer race. The anti pull-out collar has a radial thickness configured to prevent radial expansion of the outer race.

In one embodiment, the exterior surface of the outer race has a flange that extends radially outward from and circumferentially around the exterior surface proximate the outer axial end. The flange has a shoulder facing axially towards the outer axial end or the inner axial end, and has an outer circumferential surface.

In some embodiments, the ball joint is installed in a receiving area of a bearing housing and the second axial end of the anti pull-out collar engages an axial face of the housing.

In some embodiments, the anti pull-out collar is installable over the outer axial end of the outer race.

In some embodiments, the ball joint is installed in a housing and the second axial end of the anti pull-out collar faces axially toward an axial face of the housing.

There is further disclosed herein a method of increasing the load capacity of a ball joint. The method includes providing a ball joint that has an outer race with an inner member that has a ball portion disposed partially in the outer race and is contained in the outer race. The method includes installing an anti pull-out collar around a portion of the outer member to withstand (e.g., counteract, mitigate or prevent) radial expansion of the outer race in response to pull-out forces applied to the ball and thereby increasing the load capacity of the ball joint.

DETAILED DESCRIPTION

Figure 1A:
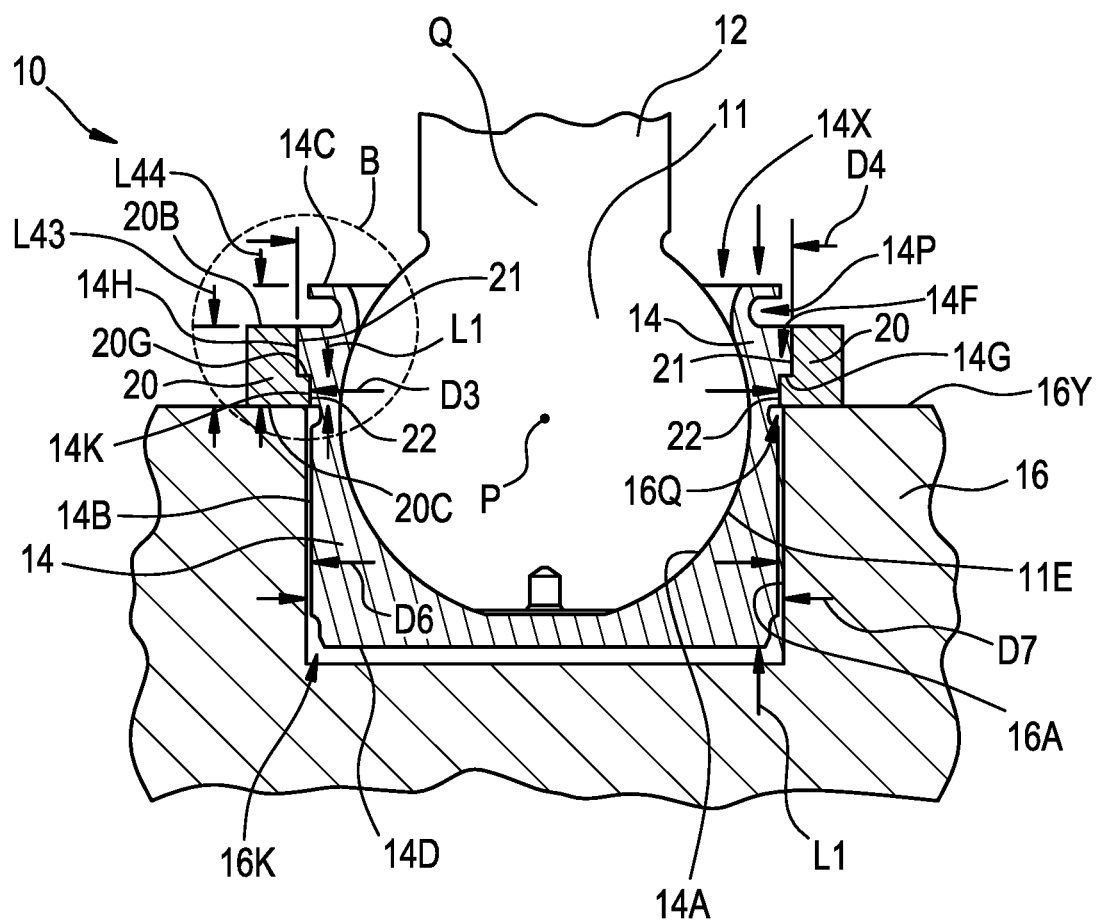
FIG. 1A is a cross sectional view of a ball joint installed in a bearing housing and having an anti pull-out collar of the present invention installed thereon.

As shown in FIG. 1A, a ball joint is generally designated by the numeral 10. The ball joint 10 includes an outer race 14 having an exterior surface 14B extending from outer axial end 14C to inner axial end 14D thereof. The outer race 14 has an interior area defined by a spherical inner surface 14A. The interior area has an opening 14X proximate the outer axial end 14C. The outer race 14 is closed at the inner axial end 14D. The ball joint includes an inner member that has a spherical ball 11 that has a stem 12 extending therefrom and extending outwardly from the opening 14X. The ball 11 has a spherical outer surface 11E. A portion of (e.g., 70 to 90 percent) the ball 11 is disposed in the interior area with the spherical outer surface 11E slidingly engaging the spherical inner surface 14A of the outer race 14 to facilitate angular misalignment of the ball 11 and stem 12 relative to the outer race 14. The ball 11 is contained in the interior area of the outer race 14 by the spherical inner surface 14A which extends over the spherical outer surface 11E towards the stem 12 beyond a center point P of the ball 11.

As shown, for example, in FIG. 1A, the exterior surface 14B of the outer race 14 has a flange 14F extending radially outward from and circumferentially around the exterior surface 14B proximate the outer axial end 14C. The flange 14F has a shoulder 14G facing axially towards the inner axial end 14D of the outer race 14 and having an outer circumferential surface 14H. The exterior surface 14B of the outer race 14 has a segment 14K that engages a portion of an anti pull-out collar 20, as described herein. The outer race 14 is disposed in an interior area 16K (e.g., a receiving area) of a bearing housing 16 which has an opening 16Q located at an end thereof. The exterior surface 14B of the outer race 14 has an outside diameter D6. The exterior surface 14G engages a cylindrical interior surface 16A of the bearing housing 16. The cylindrical interior surface 16A has an inside diameter D7 that is slightly less (e.g., 0.002 to 0.004 inches) than the outside diameter D6 to cause the outer race 14 to be press fit (i.e., interference fit) into the bearing housing 16. The outer race 14 has an overall axial length L1 that extends between the first axial end 14C to the second axial end 14D. The first axial end 14C of the outer race 14 protrudes out of the housing 16 at an opening 16Q thereof, a distance L44 that is about 20 to about 25 percent of the overall axial length L1 of the outer race 14.

The outside diameter D29 of the anti pull-out collar is greater than the inside diameter D7 of the cylindrical interior surface 16A of the housing 16. The inside diameter D22 of the second section 22 of the anti pull-out collar 20 is about equal to the inside diameter D7 of the cylindrical interior surface 16A of the housing 16. The inside diameter D21 of the first section 22 of the anti pull-out collar 20 is greater than the inside diameter D7 of the cylindrical interior surface 16A of the housing 16.

As shown in FIG. 1A, the anti pull-out collar 20 of the present invention is disposed around the outer race 14 proximate the flange 14F, as described herein. The entire anti pull-out collar 20 is located beyond the center point P of the ball 11 towards the first axial end 14C of the outer race 14. The anti pull-out collar 20 establishes a torque stabilization feature configured to maintain operating torque (e.g., torque required to misalign the ball 11 relative to the outer race 14) of the ball joint 10 within a predetermined range. The anti pull-out collar 20 is in the form of an annular ring that has a radially inward facing inside surface 20A that extends an overall axial length L43 between a first axial end 20B and a second axial end 20C of the anti pull-out collar 20. The radially inward facing surface 20A has a profile that is complementary in shape to the exterior surface 14B of the outer race 14. The anti pull-out collar 20 engages the outer race 14 along a length L43' which is about equal to the overall axial length L43. The anti pull-out collar 20 has a radial thickness T21 and T22 (see FIGS. 2 and 3) and outside diameter D29 configured to prevent radial expansion of the outer race 14 of the ball joint 10 that results in failure of the ball joint 10 due to pull-out of the ball 11 and stem 12 from the outer race 14, in response to pull-out loads Q applied thereto. The anti pull-out collar 20 is circumferentially continuous.

Figure 2:
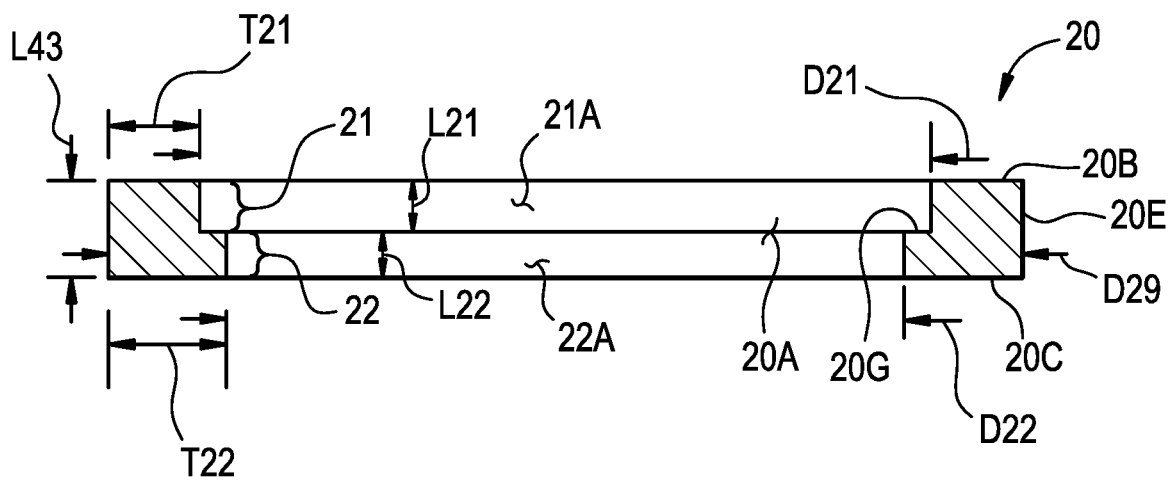
FIG. 2 is a cross sectional view of the anti pull-out collar of FIG. 1A.
Figure 3:
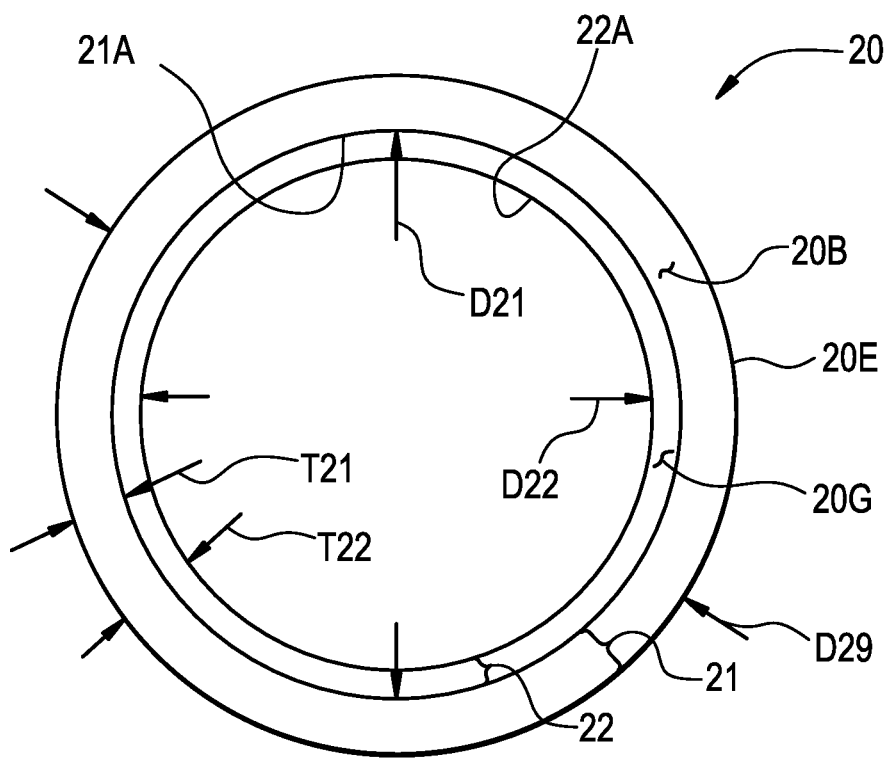
FIG. 3 is a top view of the anti pull-out collar of FIG. 1A.
Figure 4:
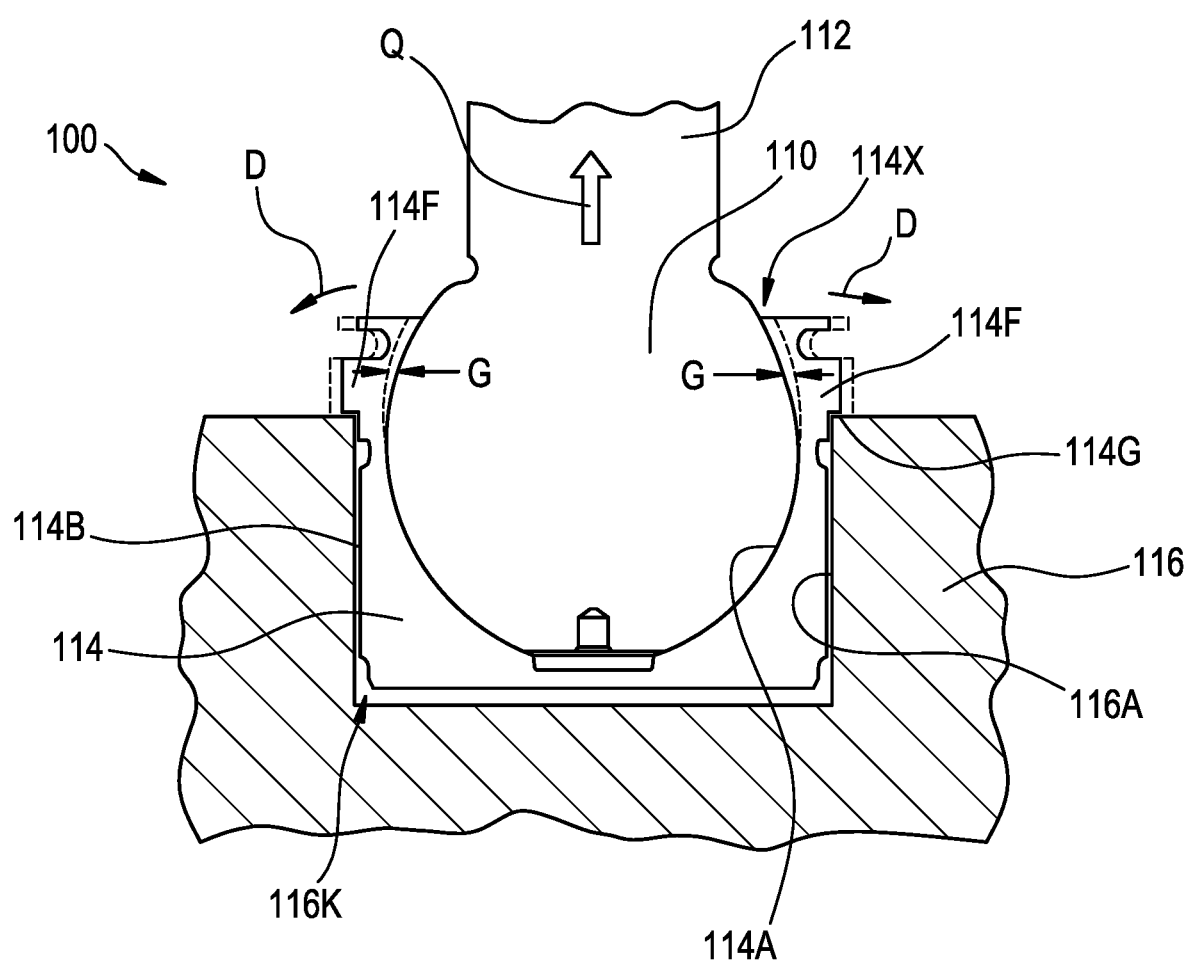
FIG. 4 is a cross sectional view of a prior art ball joint installed in a bearing housing.

As shown in FIG. 2, the profile of the anti pull-out collar 20 is defined by a first section 21 having a first inside diameter D21 and a second section 22 having a second inside diameter D22. The first inside diameter D21 is greater than the second inside diameter D22. An axially facing abutment surface 20G extends between the first section 21 and the second section 22. The abutment surface 20G is axially facing towards the first axial end 20B. The radial thickness T21 occurs in the first section 21 and extends between an inside surface 21A of the first section 21 and an exterior surface 20E of the anti pull-out collar 20. The exterior surface 20E is exposed. The radial thickness T22 occurs in the second section 22 and extends between an inside surface 22A of the second section 22 and the exterior surface 22E of the anti pull-out collar 20. The first section 21 extends an axial length L21 between the first axial end 20B and the abutment surface 20G. The second section 22 extends an axial length L22 between the second axial end 20C and the abutment surface 20G. The axial length L21 is about 60 to about 70 percent of the overall axial length L43. The second axial end 20C of the anti pull-out collar 20 engages an axial face 16Y of the housing 16.

As shown in FIG. 1A, the anti pull-out collar 20 engages a portion of the exterior surface 14B of the outer race 14. For example, the outer circumferential surface 14H engages (e.g., frictionally engages) the inside surface 21A of the first section 21; the shoulder 14G engages the abutment surface 20G; and the segment 14K engages (e.g., frictionally engages) the inside surface 22A of the second section 22. The second section 22 of the anti pull-out collar 20 is disposed axially between an axial face 16Y of the bearing housing 16 and the shoulder 14G of the flange 14F. The shoulder 14G of the outer race 14 faces axially toward the axial face 16Y of the housing. The abutment surface 20G of the anti pull-out collar 20 faces axially away from the axial face 16Y of the housing 16. The circumferential surface 14H has an outside diameter D4 that is slightly greater than the inside diameter D21 of the first section 21 to create an interference fit therebetween. The segment 14K has an outside diameter D3 that is slightly greater than the inside diameter D22 of the second section 22 to create an interference fit therebetween. The interference fit provides a retention feature configured to retain the anti pull-out collar 20 on the exterior surface 14B of the outer race 14 and has utility in ensuring the anti pull-out collar 20 is secured to the outer race 14 during shipping and installation of the ball joint 10 in the housing 16. The interference fit has further utility by imparting compressive stresses on the outer race 14 and the anti pull-out collar 20 to increase fatigue resistance thereof. Furthermore, the anti pull-out collar 20 is manufactured from a metallic material (e.g. an iron based alloy such as steel) that is heat treated to obtain predetermined stiffness and fatigue resistance. The outer race 14, the spherical ball 11 and the stem 12 are made from a metallic material (e.g. an iron based alloy such as steel). However, other materials may be employed including but not limited to copper based alloys such as brass or bronze, titanium and composite materials.

Figure 1B:
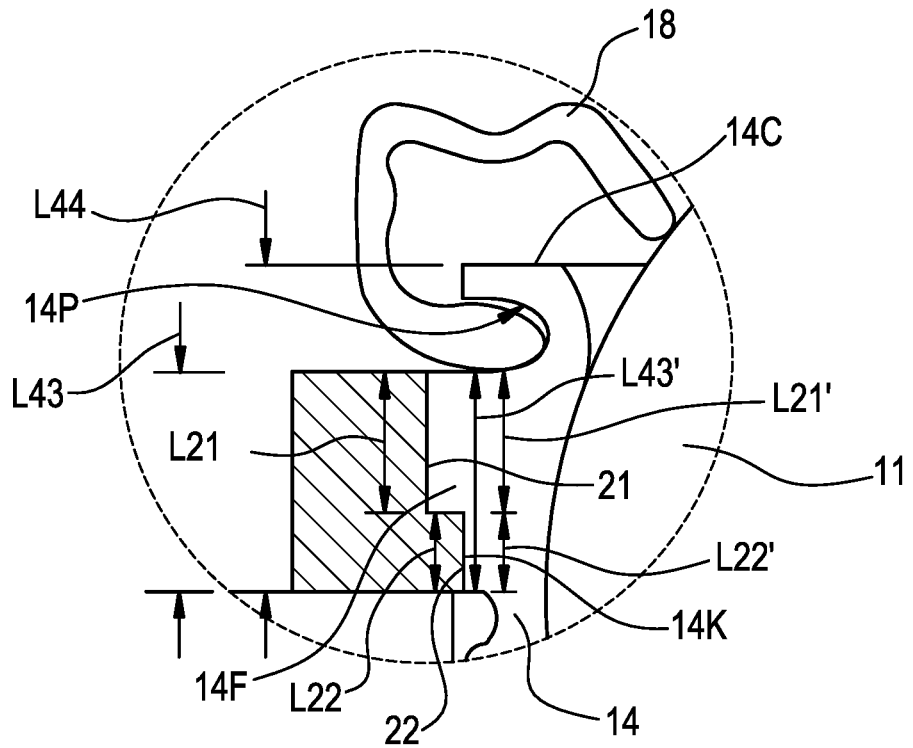
FIG. 1B is a cross sectional view of the anti pull-out collar within circle B in FIG. 1A including a seal.

FIG. 1B depicts the first axial end 14C of the outer race 14 in greater detail. A seal receiving groove 14P is incorporated into the outer race 14 between the flange 14F and the first axial end 14C. In the depicted embodiment, the seal receiving groove 14P faces radially outward from the outer race 14 away from the ball 11. One end of a seal 18 is seated in the seal receiving groove 14P. The seal 18 extends toward the stem 12 and contacts (e.g., slidingly engages) the ball 11. The seal 18 prevents outside contaminants from entering the interface between the outer race 14 and the ball 11 and in some embodiments retains lubricant between the outer race 14 and ball 11.

There is disclosed herein a method of increasing the load capacity (e.g., also referred to as a method of retrofitting a ball joint to increase load capacity thereof) of the ball joint 10. The method includes providing a ball joint 10 having an outer race 14 with an inner member having a ball portion 11 disposed partially in the outer race 14 and contained in the outer race 14. The method includes installing an anti pull-out collar 20 around a portion of the outer member 14 to withstand (e.g., counteract, prevent or mitigate) radial expansion of the outer race in response to pull-out forces Q applied to the ball 11 and thereby increasing the load capacity of the ball joint 10.

Figure 5:
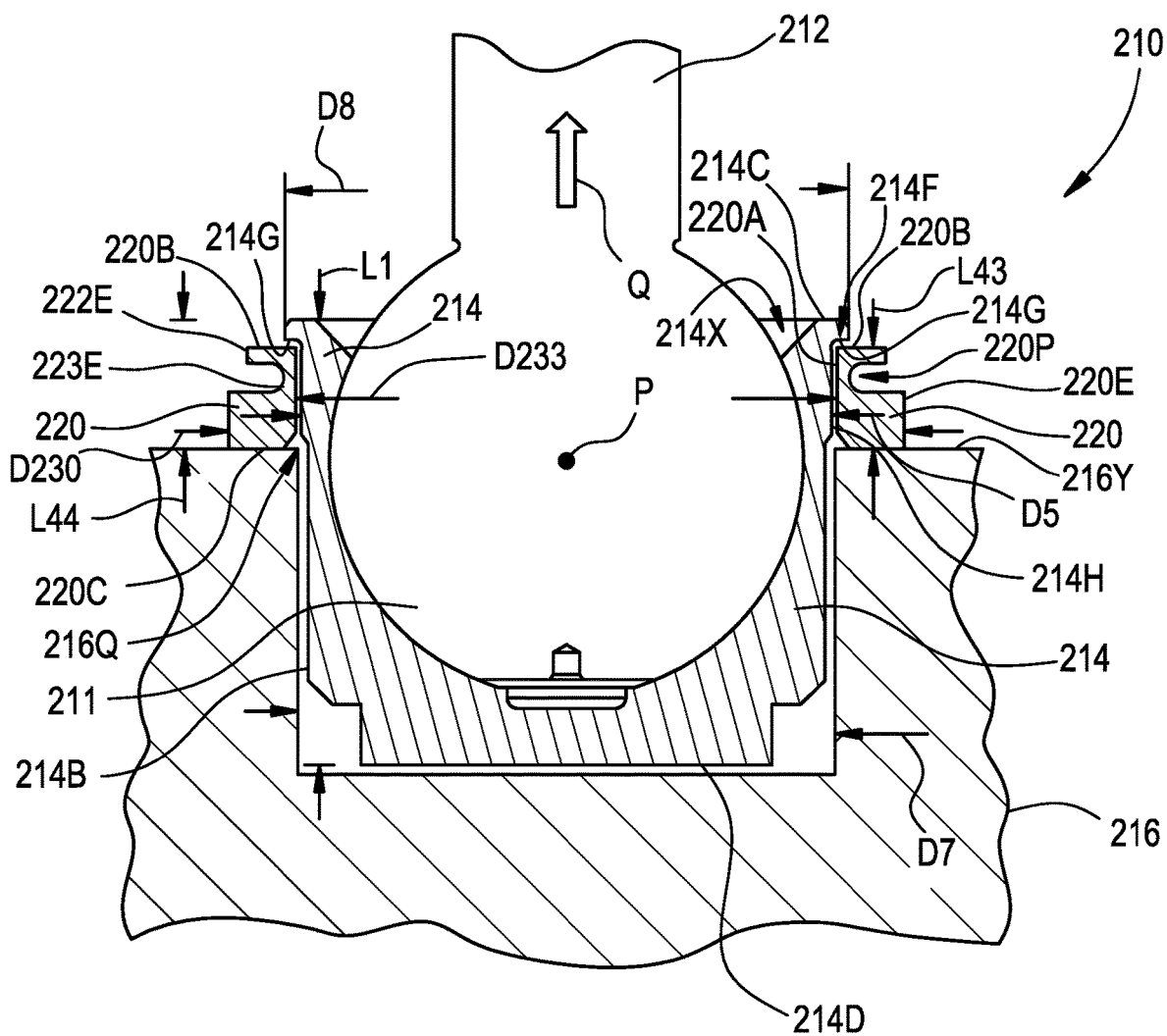
FIG. 5 is a side sectional view of an alternate embodiment of the anti pull-out collar of FIG. 1A.

FIG. 5 depicts an alternate embodiment of an outer race 214 and anti pull-out collar 220. Elements similar in structure to those discussed with respect to FIG. 1A are depicted in FIG. 5 with the numeral "2" immediately preceding the reference numeral. The discussion of these elements with respect to FIG. 1A is incorporated herein by reference and the differences between the embodiments are discussed in detail as follows. In the embodiment depicted in FIG. 5, the seal receiving groove 220P is incorporated into the radially exterior surface 220E of the anti pull-out collar 220. A flange 214F extends radially outward from the outer race 214 and is located proximate the outer axial end 214C of the outer race 214. The flange 214F has an outside diameter D8 that is greater than the inside diameter D7 of the cylindrical interior surface 16A of the housing 16. The anti pull-out collar 220 is secured to the outer race 214 and the flange 214F axially retains the anti pull-out collar 220 against the bearing housing 216. A shoulder 214G of the flange 214F limits the axial travel of anti pull-out collar 220. In the embodiment depicted in FIG. 5, the outer circumferential surface 214H of the outer race 214 is secured to the inside surface 220A of the anti pull-out collar 220 by a threaded connection. The outer circumferential surface 214H has an outside diameter D5 that is about the same as an inside diameter D233 of the inside surface 220A of the anti pull-out collar 220. The anti pull-out collar 220 is threaded on to the outer ring 214 so that the axial end 220B engages the shoulder 214G of the flange 214F, before the outer ring 214 is press fit into the housing 216. Other connection means between the outer circumferential surface 214H and the inside surface 220A (e.g. press fit, adhesive, etc.) do not substantially depart from the invention disclosed herein.

The anti pull-out collar 220 is disposed around the outer race 214 proximate the flange 214F, as described herein. The anti pull-out collar establishes a torque stabilization feature configured to maintain operating torque (e.g., torque required to misalign the ball 211 relative to the outer race 214) of the ball joint 210 within a predetermined range. The anti pull-out collar 220 has a radial thickness T21 and T22 (see FIG. 7 as described below) configured to prevent radial expansion of the outer race 214 of the ball joint 210 that results in failure of the ball joint 210 due to pull-out of the ball 211 and stem 212 from the outer race 214, in response to pull-out loads Q applied thereto. The first axial end 214C of the outer race 214 protrudes out of the housing 216 at an opening 216Q thereof, a distance L44 that is about 25 to about 30 percent of the overall axial length L1 of the outer race 214.

Figure 6:
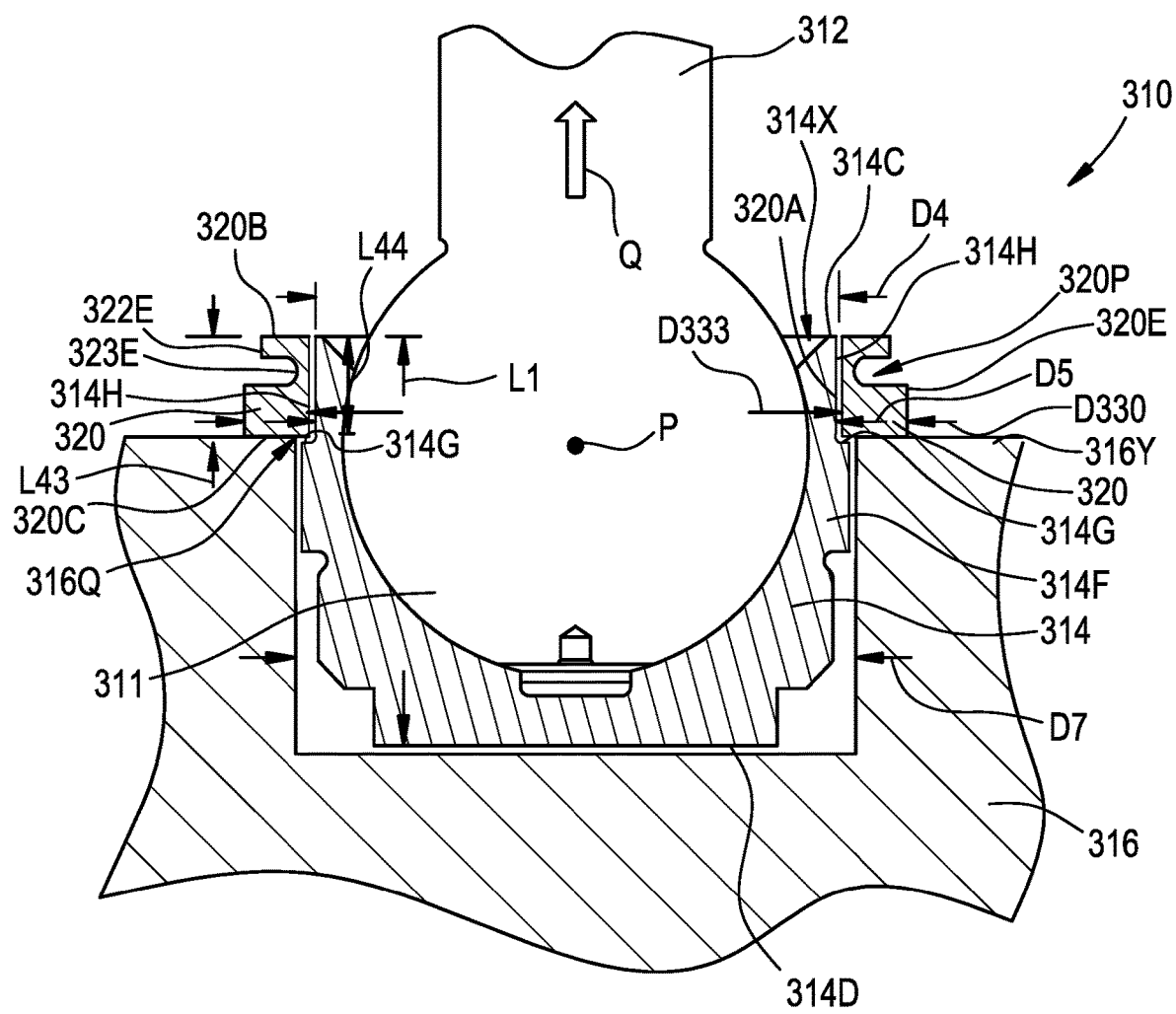
FIG. 6 is a side sectional view of an alternate embodiment of the anti pull-out collar of FIG. 1A.

FIG. 6 depicts an alternate embodiment of the outer race 314 with the flange 314F spaced axially away from the first axial end 314C. Elements similar in structure to those discussed with respect to FIG. 1A are depicted in FIG. 6 with the numeral "3" immediately preceding the reference numeral. The discussion of these elements with respect to FIG. 1A is incorporated herein by reference and the differences between the embodiments are discussed in detail as follows. In the embodiment depicted in FIG. 6, the seal receiving groove 320P is incorporated into the radially exterior surface 320E of the anti pull-out collar 320. The anti pull-out collar 320 is secured to the outer race 314 and the anti pull-out collar 320 retains the flange 314F in the axial direction. A shoulder 314G of the flange 314F limits axial travel of the anti pull-out collar 320. The anti pull-out collar 320 is threaded on to the outer ring 314 so that the anti pull-out collar 320 engages the shoulder 314G. The anti pull-out collar is installable over the outer ring 314 with the outer ring 314 installed in the housing 316 or with the outer ring 314 removed from the housing. Other connection means between the outer circumferential surface 314H and the inside surface 320A (e.g. press fit, adhesive, etc.) do not substantially depart from the invention disclosed herein. The first axial end 314C of the outer race 314 protrudes out of the housing 316 at an opening 316Q thereof, a distance L44 that is about 25 about 30 percent of the overall axial length L1 of the outer race 314. The anti pull-out collar 320 is installable over (e.g., can fit over, be threaded over or press fit over) the second inside diameter D5 of the outer ring 314.

As shown in FIGS. 5 and 6, the anti pull-out collar 220, 320 is in the form of an annular ring that has a radially inward facing inside surface 220A, 320A that extends between a first axial end 220B, 320B and a second axial end 220C, 320C of the anti pull-out collar 220, 320. The radially inward facing surface 220A, 320A has a profile that is complementary in shape to the outer circumferential surface 214H, 314H of the outer race 214, 314, respectively. As depicted in FIG. 5, the shoulder 214G is axially facing towards the inner axial end 214D of the outer race 214. As depicted in FIG. 6, the shoulder 314G is axially facing towards the outer axial end 314C of the outer race 314.

Figure 7:
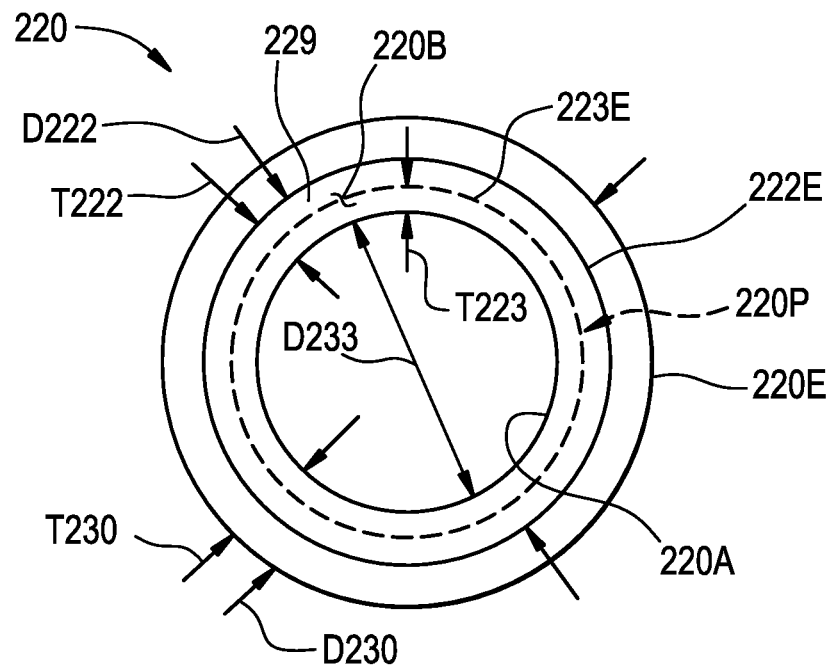
FIG. 7 is a top view of the anti pull-out collar of FIG. 5.

Referring to FIG. 7, the anti pull-out collar 220 has an overall radial thickness T230 that extends between the inside surface 220A and the exterior surface 220E of the anti pull-out collar 220 adjacent the second axial end 220C (see FIG. 5). The anti pull-out collar 220 has an overall outside diameter D230. The anti pull-out collar 220 has a seal receiving groove 220P formed therein adjacent to the third axial end 220B. The seal receiving groove 220P has a base portion 223E (e.g., innermost extremity) and a lip 229 that extends radially outward to a circumferential exterior surface 222E which has an outside diameter D222. The lip 229 has a radial thickness T222 that extends between the inside surface 220A and the exterior surface 222E of the anti pull-out collar 220 adjacent the first axial end 220B. The seal receiving groove 220P has a radial thickness T223 measured between the inside surface 220A and the base portion 223E. The inside diameter D233 of the anti pull-out collar 220 is about equal to the outside diameter D5 of the outer race 214. The outside diameter D222 is less than the outside diameter D230 of the anti pull-out collar 220. The thickness T230 is greater than the thickness T222 which is greater than the thickness T223. The outside diameter D5 of the outer race 214 is greater than the inside diameter D7 of the housing 316.

Figure 8:
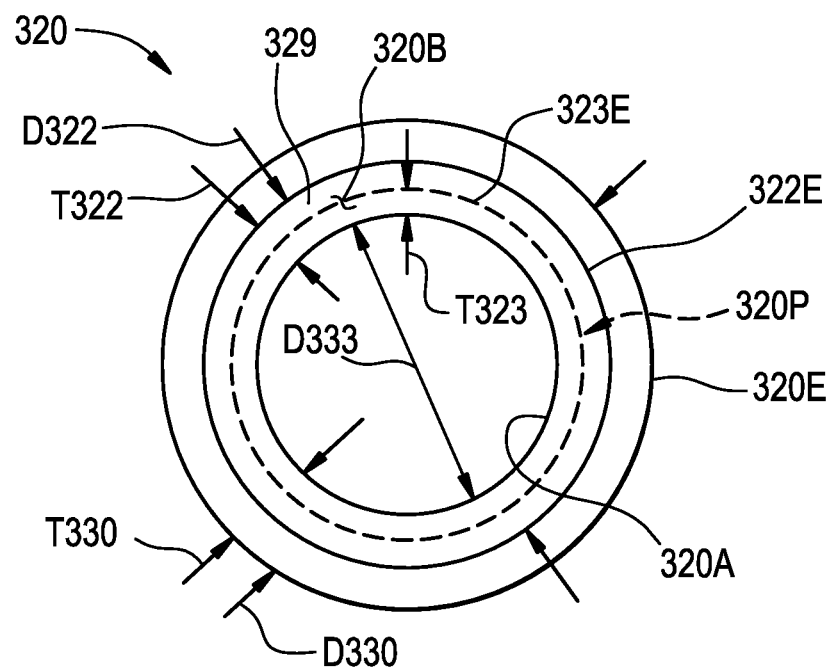
FIG. 8 is a top view of the anti pull-out collar of FIG. 6.

Referring to FIG. 8, the anti pull-out collar 320 has an overall radial thickness T330 that extends between the inside surface 320A and the exterior surface 320E of the anti pull-out collar 320 adjacent the second axial end 320C (see FIG. 6). The anti pull-out collar 320 has an overall outside diameter D330. The anti pull-out collar 320 has a seal receiving groove 320P formed therein adjacent to the third axial end 320B. The seal receiving groove 320P has a base portion 323E (e.g., innermost extremity) and a lip 329 that extends radially outward to a circumferential exterior surface 322E which has an outside diameter D322. The lip 329 has a radial thickness T322 that extends between the inside surface 320A and the exterior surface 322E of the anti pull-out collar 320 adjacent the first axial end 320B. The seal receiving groove 320P has a radial thickness T323 measured between the inside surface 320A and the base portion 323E. The inside diameter D333 of the anti pull-out collar 320 is about equal to the outside diameter D5 of the outer race 314. The outside diameter D322 is less than the outside diameter D330 of the anti pull-out collar 320. The thickness T330 is greater than the thickness T322 which is greater than the thickness T323. The outside diameter D5 of the outer race 314 is less than the inside diameter D7 of the housing 316.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A ball joint installed in a receiving area of a bearing housing, the ball joint comprising:
    an outer race having an exterior surface extending from an outer axial end to an inner axial end thereof, and having an interior area defined by a spherical inner surface, the interior area having an opening proximate the outer axial end;
    an inner member comprising a spherical ball having a stem extending therefrom, the ball having a spherical outer surface, the ball being disposed in the interior area with the spherical outer surface engaging the spherical inner surface and the ball being contained therein by the spherical inner surface, and the stem extending out of the opening; and
    an anti pull-out collar comprising:
        an annular ring having a radially inward facing inside surface extending between a first axial end and a second axial end;
        the inside surface having a profile complementary in shape to a portion of the exterior surface of the outer race;
        the anti pull-out collar being disposed around the outer race, and the entire anti pull-out collar being located between the outer axial end and the inner axial end; and
        the anti pull-out collar having a radial thickness configured to prevent radial expansion of the outer race,
    wherein the anti pull-out collar is circumferentially continuous and comprises a metallic material; and
    wherein the second axial end of the ant pull-out collar engages an axial face of the bearing housing.

2. The ball joint of claim 1, wherein the profile is defined by a first section having a first inside diameter and a second section having a second inside diameter that is less than the first inside diameter and an axial facing abutment surface extending between the first section and the second section.

3. The ball joint of claim 2, wherein at least one of the first inside diameter and the second inside diameter has an interference fit on the exterior surface of the outer race.

4. The ball joint of claim 2, wherein the outer race comprises a shoulder which engages the abutment surface.

5. The ball joint of claim 2, wherein at least one of the first inside diameter and the second inside diameter has a threaded connection with the exterior surface of the outer race.

6. The ball joint of claim 2, wherein the first section is cylindrical, and the second section is cylindrical.

7. The ball joint of claim 1, wherein the metallic material is heat treated to obtain predetermined stiffness and fatigue resistance.

8. The ball joint of claim 1, wherein the profile comprises a retention feature configured to retain the anti pull-out collar on the exterior surface of the outer race.

9. The ball joint of claim 1, wherein the anti pull-out collar comprises a torque stabilization feature configured to maintain operating torque of the ball joint within a predetermined range.

10. The ball joint of claim 1, wherein the exterior surface of the outer race comprises a flange extending radially outward from and circumferentially around the exterior surface, the flange having a shoulder facing one of:
    (a) axially towards the inner axial end and having an outer circumferential surface; and
    (b) axially towards the outer axial end.

11. The ball joint of claim 1, wherein the exterior surface comprises a flange extending radially outward from and circumferentially around the exterior surface proximate the outer axial end, the flange having a shoulder facing axially towards the inner axial end and having an outer circumferential surface; and
    wherein a section of the anti pull-out collar is disposed axially between the bearing housing and the flange.

12. The ball joint of claim 1, further comprising an axial restraint system.

13. The ball joint of claim 12, wherein the axial restraint system comprises a shoulder of the outer race axially retaining an abutment surface of the anti pull-out collar, the abutment surface is defined in the profile of the anti pull-out collar, and the abutment surface faces axially towards the outer axial end of the outer race.

14. The ball joint of claim 12, wherein the axial restraint system comprises a shoulder of the outer race axially retaining the first axial end of the anti pull-out collar.

15. The ball joint of claim 1, wherein the anti pull-out collar is installable over the outer axial end of the outer race.

16. The ball joint of claim 1, wherein a shoulder of the outer race faces axially toward the axial face of the bearing housing.

17. The ball joint of claim 16, wherein the anti pull-out collar is outside of the housing.

18. The ball joint of claim 1, wherein an exterior surface of the anti pull-out collar has an exposed exterior surface.

19. The ball joint of claim 1, wherein the anti pull-out collar does not contact the spherical ball.

20. A ball joint installed in a housing, the ball joint comprising:
    an outer race having an exterior surface extending from an outer axial end to an inner axial end thereof, and having an interior area defined by a spherical inner surface, the interior area having an opening proximate the outer axial end;
    an inner member comprising a spherical ball having a stem extending therefrom, the ball having a spherical outer surface, the ball being disposed in the interior area with the spherical outer surface engaging the spherical inner surface and the ball being contained therein by the spherical inner surface, and the stem extending out of the opening; and
    an anti pull-out collar comprising:
        an annular ring having a radially inward facing inside surface extending between a first axial end and a second axial end;
        the inside surface having a profile complementary in shape to a portion of the exterior surface of the outer race;
        the anti pull-out collar being disposed around the outer race, and the second axial end of the anti pull-out collar is located above a center point of the ball and the first axial end of the anti pull-out collar extends in a direction along an axis of the outer race towards the stem; and the anti pull-out collar having a radial thickness configured to prevent radial expansion of the outer race, wherein the entire anti pull-out collar is located outside of the housing.

21. The ball joint of claim 20, wherein the first axial end of the anti pull-out collar does not extend above the outer axial end.

22. A ball joint comprising:

an outer race having an exterior surface extending from an outer axial end to an inner axial end thereof, and having an interior area defined by a spherical inner surface, the interior area having an opening proximate the outer axial end;

an inner member comprising a spherical ball having a stem extending therefrom, the ball having a spherical outer surface, the ball being disposed in the interior area with the spherical outer surface engaging the spherical inner surface and the ball being contained therein by the spherical inner surface, and the stem extending out of the opening; and an anti pull-out collar comprising:

an annular ring having a radially inward facing inside surface extending between a first axial end and a second axial end;

the inside surface having a profile complementary in shape to a portion of the exterior surface of the outer race, the profile is defined by a first section having a first inside diameter and a second section having a second inside diameter that is less than the first inside diameter and an axial facing abutment surface extending between the first section and the second section, and at least one of the first inside diameter and the second inside diameter has an interference fit on the exterior of the outer race;

the anti pull-out collar being disposed around the outer race, and the entire anti pull-out collar being located between the outer axial end and the inner axial end; and the anti pull-out collar having a radial thickness configured to prevent radial expansion of the outer race, wherein the anti pull-out collar is circumferentially continuous and comprises a metallic material.

* * * * *